United States Patent
Lohmar et al.

(10) Patent No.: US 8,200,245 B2
(45) Date of Patent: Jun. 12, 2012

(54) TECHNIQUE FOR CONTROLLING POINT-TO-MULTIPOINT DATA TRANSMISSIONS

(75) Inventors: Thorsten Lohmar, Aachen (DE); Uwe Horn, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 755 days.

(21) Appl. No.: 12/302,955

(22) PCT Filed: Jun. 2, 2006

(86) PCT No.: PCT/EP2006/005287
§ 371 (c)(1),
(2), (4) Date: Dec. 1, 2008

(87) PCT Pub. No.: WO2007/140796
PCT Pub. Date: Dec. 13, 2007

(65) Prior Publication Data
US 2009/0247208 A1 Oct. 1, 2009

(51) Int. Cl.
*H04W 24/00* (2009.01)
*H04M 3/42* (2006.01)

(52) U.S. Cl. .......... 455/456.3; 455/456.1; 455/458; 455/414.1

(58) Field of Classification Search ........... 455/414.1, 455/414.3, 456.1–458
See application file for complete search history.

(56) References Cited

U.S. PATENT DOCUMENTS

| | | | |
|---|---|---|---|
| 2002/0163912 A1* | 11/2002 | Carlson | 370/392 |
| 2003/0050955 A1* | 3/2003 | Eatough et al. | 709/201 |
| 2003/0187931 A1* | 10/2003 | Olsen et al. | 709/205 |
| 2004/0203773 A1* | 10/2004 | Balasubramanian et al. | 455/435.1 |
| 2004/0246985 A1* | 12/2004 | Kall et al. | 370/432 |
| 2005/0281209 A1* | 12/2005 | Cai et al. | 370/270 |
| 2006/0050672 A1* | 3/2006 | Shim et al. | 370/338 |
| 2007/0121560 A1* | 5/2007 | Edge | 370/338 |

FOREIGN PATENT DOCUMENTS

WO  WO 2005/125238 A  12/2005

OTHER PUBLICATIONS

Universal Mobile Telecommunications System (UMTS); Multimedia Broadcast/Multicast Service (MBMS); Protocols and codecs (3GPP TS 26.346 version 6.0.0 Release 6), published in Mar. 2005, p. 13 and 52.*

* cited by examiner

*Primary Examiner* — Lester Kincaid
*Assistant Examiner* — Daniel Lai (57) ABSTRACT

A technique for controlling a point-to-multipoint (PTM) transmission of data over a PTM-enabled network (150) to a user group is proposed. In a first PTM transmission, a location information query message is distributed into a group service area (154). Upon receiving the query message, items of user equipment respond with location information response messages comprising location information indicative of a location of the respective user equipment. On the basis of the received location information response messages, a content transmission area (156, 157, 158) is determined. A second PTM transmission is then initiated into the content transmission area for content distribution. Furthermore, the content may be distributed via unicast retrieval.

22 Claims, 8 Drawing Sheets

TECHNIQUE FOR CONTROLLING POINT-TO-MULTIPOINT DATA TRANSMISSIONS

FIELD OF THE INVENTION

The invention generally relates to the field of multicast/broadcast transmission of content data. More specifically, the invention relates to a technique for controlling a point-to-multipoint transmission of content over a broadcast-enabled network to a user group.

BACKGROUND OF THE INVENTION

Telephony, messaging and on-demand streaming services are examples for Point-to-Point (PTP) or unicast communication services. Broadcast and multicast services, on the other hand, are based on Point-To-Multipoint (PTM) communication. Using PTM communication, content (such as voice, text, graphics or multimedia data) is transmitted from typically a single source to multiple destinations. PTM services might for example be streaming services or file delivery services.

A multicast PTM service delivers content to users who have registered to a particular multicast group. Usually, a multicast group includes a plurality of users interested in a particular content, for example news in the field of sports, economics, politics, etc.

A broadcast PTM service of a broadcast-enabled network, for example a mobile network, broadcasts content data into a predetermined geographical area. The users do not need to register or join a group prior to receiving the content.

The 3GPP (3$^{rd}$-Generation Partnership Project) has specified broadcast and multicast services for GSM (Global System for Mobile Communications) and UMTS (Universal Mobile Telecommunications System) networks, namely the Multimedia Broadcast and Multicast Service (MBMS) feature. The feature is documented for example in the 3GPP TS (Technical Specification) 23.246 and in the TS 26.346. MBMS adds a plurality of broadcast/multicast-related techniques to conventional GSM or UMTS networks. For performing these techniques, a functional entity is specified that controls the broadcast/multicast delivery of services, which is called the broadcast/multicast service centre (BM-SC).

Within MBMS, the BM-SC is responsible for providing and delivering broadcast/multicast services. The BM-SC serves as an entry point for content-delivery services, sets up and controls MBMS transport bearers, and can additionally be used to initiate MBMS transmissions. For example, the BM-SC may provide the service announcements that signal an upcoming multicast transmission to the user equipment (UE) being member of the related group. These announcements include all necessary information such as multicast service identifier, Internet Protocol (IP) multicast addresses, time of transmission, and media descriptions that a user equipment needs to join a multicast session.

Each broadcast/multicast service is related to a service area—the geographical area or zone, within which the content can be broadcasted or transmitted. The service area may comprise the whole PLMN (Public Land Mobile Network) of an MNO (Mobile Network Operator) or may even comprise several PLMNs, if agreed upon in a service level agreement. On the other hand, a service area may be configured to be as small as a single radio cell of a network. In general, a service area comprises a reasonable part of a PLMN.

Downstream of a PTM data source, each node in the network has a list of further downstream nodes to determine to which nodes it should forward MBMS content. Thus, a hierarchically organized content distribution tree is created with the base transceiver stations/Node B stations serving a single radio cell each and thus forming the leaves of the distribution tree.

A multicast service requires that the network knows the location of the group members registered for the service group. It is necessary to keep track of the movement of the users (inside the group service area, i.e. the service area for this particular group), even if the MBMS transmission bearer is idle, i.e. no content transmission is ongoing. Therefore a complex group management function is required, for example in the core network and the radio network of a mobile network, to be able to establish the transmission tree efficiently from a network resource point of view.

A broadcast service does not include any group management function, and therefore requires much less resources. For example, the MBMS broadcast mode only offers simple PTM transmission, i.e. the network does not keep track of the movements of the users before or during an MBMS transmission. The content is broadcasted into the broadcast service area, irrespective of locations of users which might be interested in the content. This means that the broadcast service area has to be configured as large as possible, and preferably comprises the whole broadcast-enabled network, at least for non-localized services, to ensure that the content can be received by interested users. This again leads to a waste of resources, as there might be cells or geographical areas where only very few users (or even none) are located which are interested in receiving the broadcasted content.

Accordingly, there is a need to provide an improved PTM transmission technique.

SUMMARY OF THE INVENTION

According to a first aspect of the invention, a method for controlling content distribution in a PTM-enabled network environment is proposed. The method comprises the steps of initiating a first PTM transmission of a location information query message into a group service area, wherein the group service area can be predefined for the point-to-multipoint transmission of the group data; receiving location information response messages, each location information response message comprising location information indicative of a location of a user equipment (UE) having received the location information query message; determining a content transmission area on the basis of the received location information response messages; and preparing for content distribution via a second PTM transmission into the content transmission area and/or unicast retrieval.

Preparing the distribution of the content via the second PTM transmission may comprise setting the time for the transmission session to start, providing the sender which will act as the data source for the transmission with data related to the transmission, for example the PTM address (e.g. the appropriate broadcast address) and the required bearer resources, and providing the content data to the sender. Preparing the distribution of the content via unicast retrieval may comprise setting the time for activating the unicast retrieval (i.e. the time from which on corresponding requests will be processed) for the point acting as the data source for unicast retrieval (which might be the network address of, for example, a broadcast file repair service); and providing the content to the data source, e.g. providing a location in a memory space, wherein the content is stored. Within the context of MBMS, actions to be taken to, for example, prepare a broadcast transmission and a unicast retrieval are specified in the 3GPP TS 23.246, sections 4.4.3.1, 4.4.3.2 and the TS 26.346, section 9.3.2, respectively.

A PTM-enabled network might be a network enabled for broadcast and/or multicast transmission and/or for further PTM transmission techniques, for example PTM transmission techniques to be developed in the future. The first PTM transmission and/or the second PTM transmission may for example be a broadcast transmission.

The group service area may be a geographical area. The geographical area may have any structure, for example may comprise a number of subareas, which may be neighbouring or may be remote from each other. The content transmission area may comprise one or more subareas of the group service area.

The group service area may comprise a set of cells of the network. For example, the group service area may comprise all cells of a PLMN (or several PLMNs), or may comprise only a single or few cells, e.g. for a service related to a particular geographical site. The content transmission area may comprise a subset from the set of cells of the group service area. The cells of the content transmission area may be scattered all over the group service area. The group service area and/or the content transmission area may comprise only a part of a cell. Power control techniques and antenna beam control techniques, for example, enable the granularity of the areas to be finer than just cell size.

The location information query message may comprise a location information indicator indicating the type of location information to be comprised in the location information response message. For example, the requested location information may be the cell identification (ID) of the cell in which the responding user equipment is located. Alternatively or additionally, the location information may indicate a geographical position of the user equipment, measured for example with a GPS (Global Positioning System) based technique or by the network, for example for location services the user is subscribed to. As a further example, the location information indicator may request the cell ID as mandatory and the geographical position as optional.

The location information query message may comprise a start time information indicating at least one of a time for the second PTM transmission to start and a point in time or waiting period for the user equipment to initiate unicast retrieval. The start time information may for example specify a number to be interpreted as the time from the reception of the location information query message until the second PTM transmission is going to start, e.g. 20 seconds. Alternatively, the start time information may be interpreted as a point in time, e.g. according to Greenwich Mean Time (GMT) or Universal Time. As a further example, the start time information may, in addition to containing a value, comprise an indication of how to interpret this value, i.e. as a time period or as a time point in GMT.

The location information query message may comprise address information indicating an address for a unicast retrieval of the data transmitted into the content transmission area. A UE may sometimes not receive the content transmitted via the second PTM transmission. One reason may be that the user equipment is located in the group service area but not in the content transmission area. The UE may then use a unicast communication to the address provided by the address information (automatically or on request of the user) to retrieve the content from this address. The unicast communication may be any PTP session, for example a PTP IP (Internet Protocol) session such as an FTP (File Transfer Protocol) or an HTTP (Hypertext Transfer Protocol) Session.

The PTP session may be realized for instance using a UMTS bearer service with an interactive traffic class.

The location information query message may comprise a response delay information indicating a time delay for sending the location information response message. In case many users have registered for a group service, many UEs may respond to the location information query message. In case all UEs respond instantaneously, congestion may occur in the network, for instance at the radio interface. Therefore, it is advantageous to have a spread in the answer time of the UEs. The response delay information may specify a value to be interpreted as a time interval after reception of the location information query message, e.g. 5 seconds. Each UE may respond within the specified time interval at a random time point, for example after 1.1 or 3.7 seconds. The response delay information may additionally or alternatively indicate an earliest response time, or may only provide a fixed time delay for all UEs of a group. For example, two group services may provide related content (news as pure text, and news as multimedia, but including the textual content of the first service). The response delay information may then be chosen different for these two services. The response delay information may of course comprise a combination of the above.

The method may comprise the further step of providing the content data for unicast retrieval using for example a file repair service. The 3GPP MBMS provides a file repair service as specified in the TS 26.346. This service may be reused for the technique proposed herein. In case a UE is not located within the content transmission area, the UE may use the file repair service, known as such, to retrieve the content via a unicast communication.

The content transmission area may be determined to comprise a geographical area of the network in which at least a predetermined quantity of items of user equipment is located. The quantity of items of user equipments might be defined as a percentage value, a user density value, or an absolute number. For example, a radio cell of the group service area may be determined to belong to the content transmission area if a single UE in this cell responds to the location information query message. However, the threshold might as well be set to be a higher number of users. For example, it may be required that five users respond from within a cell or cell group for the cell or cell group to be part of the content transmission area. The users which according to this algorithm will not be able to receive the second PTM transmission might have the opportunity to receive the content via a unicast communication.

The step of determining the content transmission area may comprise predicting the locations of items of user equipment during the second PTM transmission. The location information response messages allow to determine a snapshot of the approximate locations or positions of the mobile terminals at the time of reception of the location information query message. The movements of the UEs (as determined by other techniques that are well known as such) may be used to predict their locations for the time point when the second PTM transmission starts and/or when the transmission stops. The prediction might additionally or alternatively use other data, for example related to the cell itself. The cell might, for example, comprise a geographical area along a highway or railroad. If a UE responds from within this cell, it can be predicted with a certain probability that the UE will move along this highway or railroad.

The prediction might be used to optimize the determination of the content transmission area, such that it comprises a geographical area of the network in which at least a predetermined quantity of items of user equipment will be located during the second PTM transmission. For example, the cell or cells within which a UE will be located during the second PTM transmission (according to the prediction) might be included in the content transmission area.

For the UEs of stationary or slowly moving (for example, pedestrian) users an optimization may not be necessary, as their positions will essentially not change during the PTM procedure. On the other hand, the position of users in any type of moving vehicle may change quickly. An optimization would be advantageous in this case to predict the movements of these users. In case cells cover a motorway or a railway track, the next cells along the road/track might be included into the hotspot area determination.

The method may comprise the further step of determining from at least one of the location information response messages identity information related to at least one of the corresponding user equipment and a user of the corresponding user equipment. For example, an IMSI (International Mobile Subscriber Identity), TMSI (Temporary Mobile Subscriber Identity) and/or an IMEI (International Mobile Equipment Identity) may be determined for administration purposes. For instance, it might be of interest to detect if or how often a user subscribed to a group service is actually using this service or which content he or she prefers. Optionally, statistics for the response messages may be collected (e.g. to determine the size of the user group, etc.)

In the present context, a group service can, for example, be implemented by using a first broadcast service to transmit a location information query message into a group service area and by this prepare a second broadcast transmission for distribution of the actual content. Thus, broadcast transmissions are used to implement a service akin to a multicast service. For example, a registration to the service might be required. The registration of a UE responding to the location information query message might be checked before considering the location information received in a location information response message from that UE. If the UE is not registered, its response message may not be received or, if received, discarded.

According to a further aspect of the invention, a method for controlling a user equipment for reception of content in a PTM-enabled network is proposed. The method comprises the steps of receiving a location information query message via a first PTM transmission from the network; sending, in response to the location information query message, a location information response message comprising location information indicative of a location of the user equipment for a second PTM transmission; and preparing for content reception via at least one of a second PTM transmission and unicast retrieval.

The method might further comprise the step of receiving the content via the second PTM transmission. The content might additionally or alternatively be received via a unicast retrieval. This might for example be the case if the UE is not located within the content transmission area as determined by the network, either for a total or a part of the duration of the second PTM transmission. There might be further reasons why a UE was not able to receive part or all of the content, for example failures technical or bad conditions over the radio interface.

The location information may comprise a cell ID of a cell of the network the user equipment is located in. Additionally or alternatively, the location information may comprise a geographical position of the user equipment.

In a further step, a unicast retrieval timer might be set in the user equipment. The setting might be triggered by the reception of the location information query message or any other suitable event.

A timer value for the unicast retrieval timer may be determined based on a start time information comprised in the location information query message. The start time information may indicate a point in time or waiting period for unicast retrieval or indicate a PTM transmission start time. For example, if the start time information indicates a start of the second PTM transmission in 20 seconds, the timer might be set to a value slightly larger, for example 30 seconds.

The content data might be retrieved via unicast retrieval after expiration of the unicast retrieval timer in case the group data has not been received via PTM transmission. Some possible reasons for missing the content distribution via PTM transmission have been outlined already above.

The step of sending the location information response message may be randomly delayed. For example, a response delay information might have been received within the location information query message. In the alternative, a random delay may be set by the UE without an explicit indication in the location information query message. Such a random delay, which will be set to be within a predetermined time interval, may for example be network specific.

According to a further aspect of the invention, a computer program product is proposed, comprising program code portions for performing the steps of any one of the method aspects described herein, when the computer program product is run on one or more computing devices. The computer program product may be stored on a computer readable recording medium.

According to a still further aspect of the invention, a network node is proposed, which is implementing a group service control component in a PTM-enabled network environment for controlling content distribution. The network node comprises a first interface adapted for initiating a first PTM transmission of a location information query message into a group service area; a second interface adapted for receiving location information response messages, each location information response message comprising location information indicative of a location of a user equipment having received the location information query message; a processing unit adapted to determine a content transmission area on the basis of the received location information response messages; and a third interface adapted for initiating a second PTM transmission into the content transmission area.

According to another aspect of the invention, a further network node is proposed, which is implementing a group service control component in a PTM-enabled network environment for controlling a content distribution. This network node comprises a first interface adapted for initiating a first PTM transmission of a location information query message into a group service area; a second interface adapted for receiving location information response messages, each location information response message comprising location information indicative of a location of a user equipment having received the location information query message; a processing unit adapted to determine a content transmission area on the basis of the received location information response messages; and a fourth interface adapted for controlling the provision of the content for unicast retrieval.

The network node may further comprise a fifth interface adapted for providing the group data for unicast retrieval using a file repair service, for example, according to 3GPP TS 26.346. The fifth interface may be identical with the fourth interface of the network node outlined above.

According to a still further aspect of the invention, a user equipment is proposed, which is adapted for content reception in a PTM-enabled network. The user equipment comprises a first interface adapted for receiving a location information query message via a first PTM transmission from the network; and a second interface adapted for sending, in response to the location information query message, a location information response message comprising location information indicative of a location of the user equipment for content distribution control. Optionally, a third interface adapted to receive the content via one of a second PTM transmission and unicast retrieval can be provided.

The user equipment according to the above implementation of the invention may further comprise a processor implementing a unicast retrieval timer. The processor may be adapted for setting the unicast retrieval timer. The setting may be triggered by the reception of the location information query message.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with PTM services, multicast/broadcast mechanisms or other PTM communication features different from the 3GPP MBMS standard discussed below to illustrate the present invention. Also, the invention may be practiced in any network to which movable users may attach. For example, the invention is applicable to, besides mobile networks, additionally or alternatively WLAN, Bluetooth, DVB or similar wireless networks, but also to wireline networks such as, for example, the intranet of a company with some or many separated subsidiaries.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Whereas the exemplary embodiments described below are based on broadcast-enabled networks and the PTM transmissions are broadcast transmissions, the skilled person will understand that other PTM transmission techniques might also be used, for example a PTM technique based on multicast transmission or other PTM techniques to be developed in the future.

The term 'interface' as used herein comprises 'functional interfaces'. A functional interface designates a sub-structure contained within a functional component or structure (a hardware and/or software component or functional entity) intended for communication with other, external components or structures. A functional interface may be purely software-implemented, for example if the structure, for which the functional interface provides the interfacing functionality, is a software component.

Figure 1:
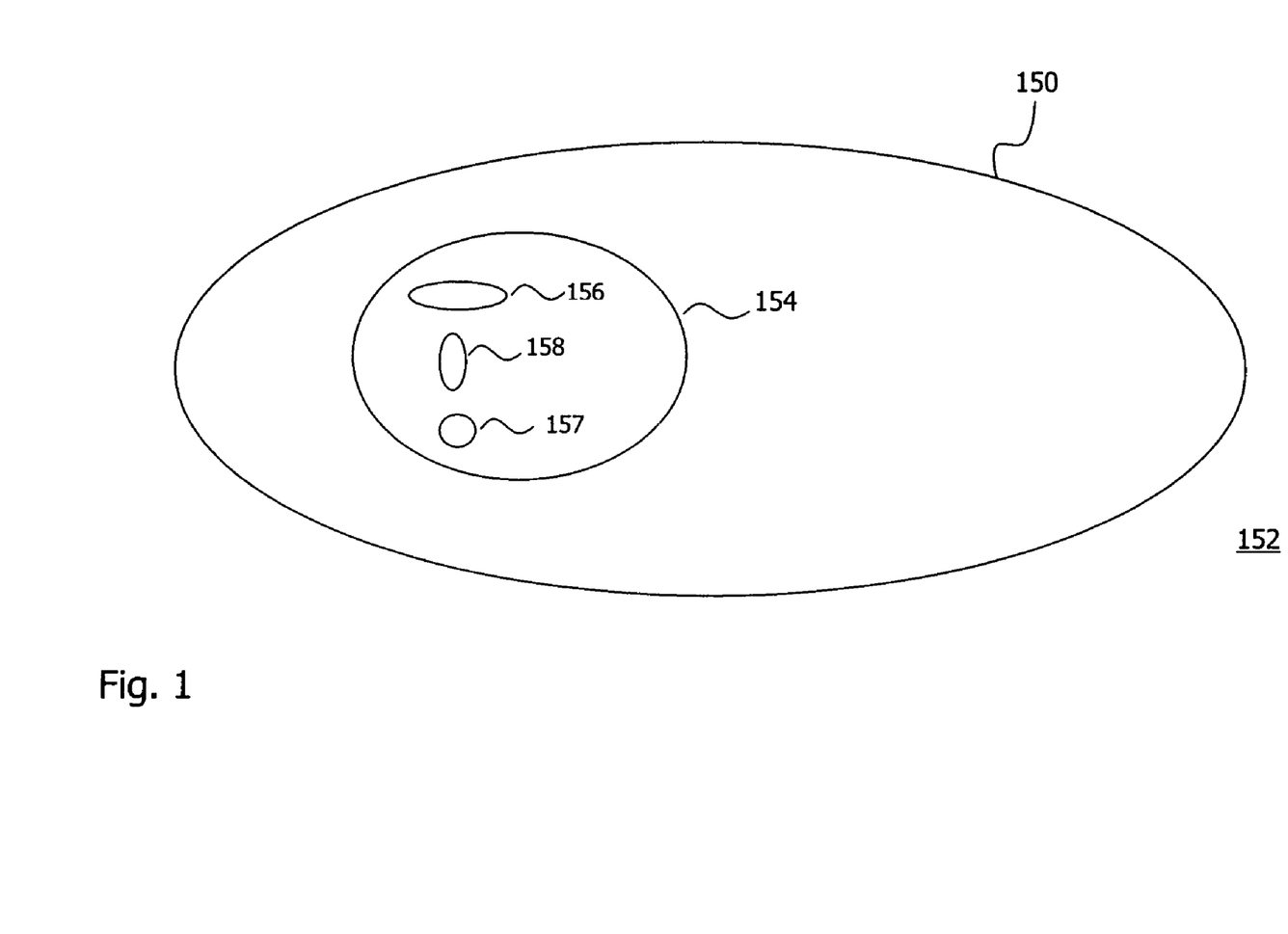
FIG. 1 is a schematic illustration of an embodiment of a PLMN.

With reference to FIG. 1, an embodiment of a broadcast-enabled network or PLMN 150 is schematically illustrated. The PLMN 150 extends over a geographical area 152. The area 152 may comprise a state or several states and may comprise rural and urban areas (not shown). The PLMN 150 may as well comprise the area of one state, several states or may comprise only part of a state.

A group service area 154 is defined within the PLMN 150. The service area 154 covers a reasonable part of the PLMN 150, although group service areas in general may be defined for a PLMN as a whole or only for very small parts of a PLMN. The group service area 154 is illustrated as being a single, simple-formed area. A group service area may, however, in general comprise several geographical subareas, which might be separated from each other. A group service area may also have holes, i.e. it may enclose areas of a broadcast-enabled network where the group service, to which the group service area is assigned to, is not offered.

For a particular content distribution, the PLMN 150 may have announced in a first broadcast transmission into the group service area 154 a location information query message. Location information response messages have been received from a number of UEs (not shown). Based on the response messages, the network 150 has determined a content transmission area. This area includes geographical areas, for example radio cells (not explicitly shown), with a density of users above a predetermined threshold value. As an example, at least five users may have to be located inside a radio cell (or cell group for example in case of soft combining) to include this radio cell (or cell group) in the content transmission area. The threshold value may be configured such that a broadcast transmission of content data into the areas with a user density above the threshold (the "hot-spot areas") is efficient in terms of resource-usage when compared to multiple unicast communications.

In the example embodiment shown in FIG. 1, the content transmission area comprises the subareas 156, 157 and 158 of the group service area 154. For example, the subarea 156 may cover a city, the smaller subarea 157 coincides with a village, and the subarea 158 may comprise radio cells extending along a highway connecting city and village.

A second broadcast transmission for distributing the content will be performed only within the subareas 156, 157 and 158. Users outside these areas or with lacking technical capabilities will have to receive the content via unicast retrieval.

Figure 2:
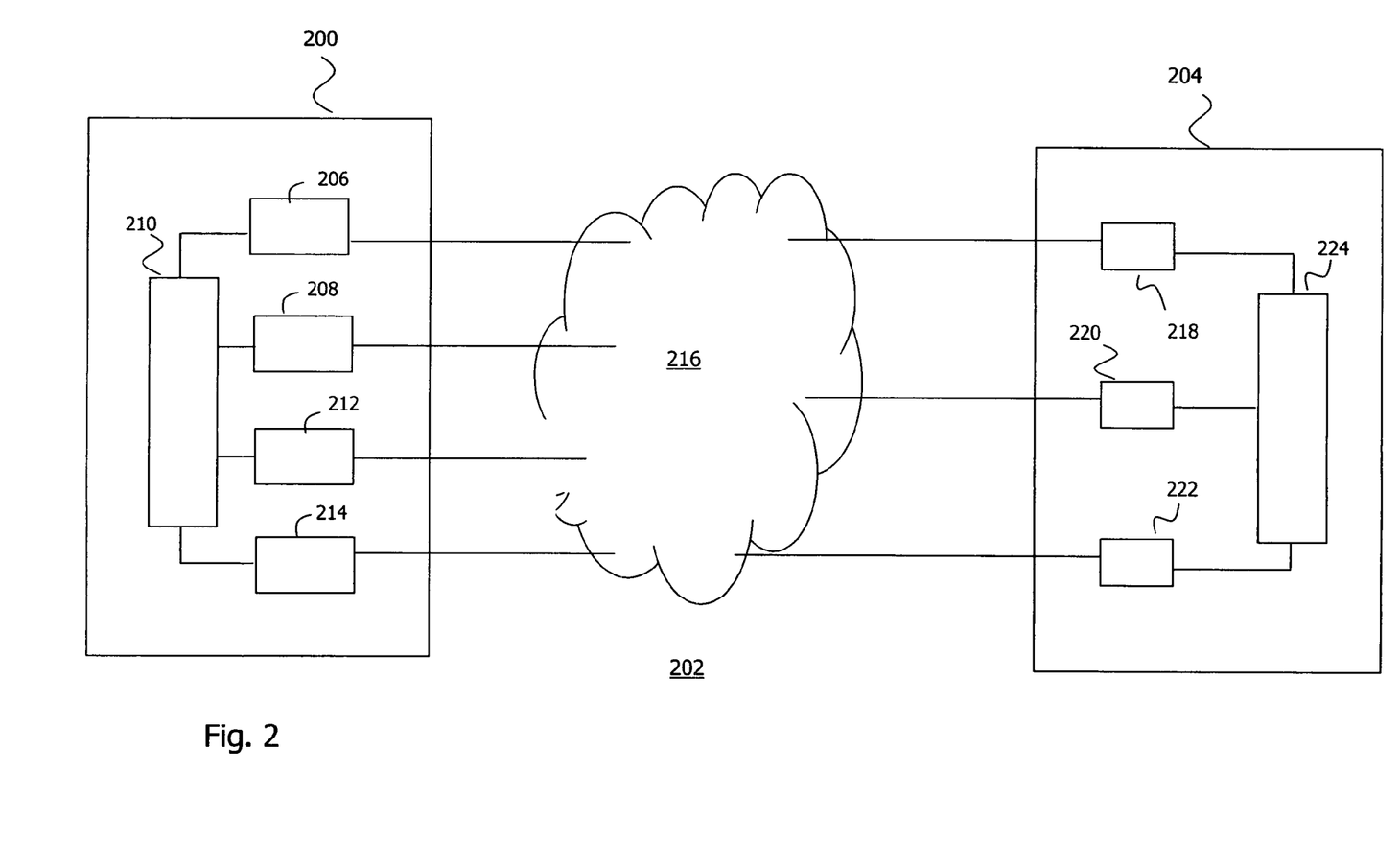
FIG. 2 is a block diagram illustrating functional components of a network node embodiment and a user equipment embodiment.

FIG. 2 schematically illustrates functional components of an embodiment of a network node 200 implementing a group service control component in a broadcast-enabled network 202 for controlling content distribution and of a user equipment 204 adapted for content reception from the network 202.

In the present embodiment, the network 202 is a mobile network, for example a UMTS network. The network 202 may for example be the PLMN 150 of FIG. 1. The group service control component implemented by the node 200 may be a BM-SC or part of a BM-SC of the UMTS network 202. The network node 200 comprises a first interface 206, which is adapted for initiating a first broadcast transmission of a location information query message into the group service area 154 (see FIG. 1), where the message might be received by the UE 204. The node 200 further comprises a second interface 208 adapted for receiving location information response messages, for example from the UE 204 and many similar UEs (not shown). With the location information response message, the UE 204 reports back location information indicative of a location of the user equipment 204.

The network node 200 further comprises a processing unit 210 adapted to determine a content transmission area 156, 157, 158 on the basis of the received location information response messages. A third interface 212 is adapted for initiating a second broadcast transmission into the content transmission area 156, 157, 158 within which the UE 204 may or may not be located. The second broadcast transmission includes content such as a file or several files or streaming data.

A fourth interface 214 of the network node 200 is adapted for controlling the provision of the content for unicast retrieval, for example in case the UE 204 is not included in the content transmission area and therefore has to retrieve the content via a unicast communication. The interface 214 might for example communicate with a content data source to indicate the time of provision of the content, and possibly to indicate retrieval parameters as, for example, the maximum bandwidth per user.

The fourth interface 214 is adapted for controlling the provision of the content for unicast retrieval using for example a file repair service according to 3GPP TS 26.346. The interface may additionally or alternatively be adapted for controlling content provision according to other mechanisms.

Messages and data are transported via a network 216 in FIG. 2. The network 216 may be part of the broadcast-enabled network 202. For example, the network 216 may comprise parts of the core network and the radio access network of the mobile network 202. To broadcast the location information query message and the content data, distribution trees are followed from a content data source (not shown) through the network 216 to the cells where the UE 204 and other UEs are located in. The content data source need not be, and in general is not, identical with the BM-SC 200, but will have its own network address.

The user equipment 204, for example a mobile telephone, comprises a first interface 218 adapted for receiving the location information query message via the first broadcast transmission from the network node 200. A second interface 220 is adapted for sending, in response to the location information query message, a location information response message comprising location information indicative of a location of the user equipment 204. The location information may be intended for the second broadcast transmission.

A third interface 222 is adapted to receive the content. The content might be received during the second broadcast transmission as initiated by the interface 212 of the BM-SC 200. The content might alternatively be received via a unicast communication, wherein the provision of the content data for unicast retrieval is controlled by the interface 214 of the network node 200. In principle it is also possible to receive the content data via the second broadcast transmission and additionally via the unicast communication, for example in cases where the broadcasted content data are corrupted, e.g. due to transmission failure.

The user equipment 204 comprises a processor 224 implementing a unicast retrieval timer. The processor 224 is adapted for setting the unicast retrieval timer. The setting is triggered by the reception of a location information query message.

Figure 3:
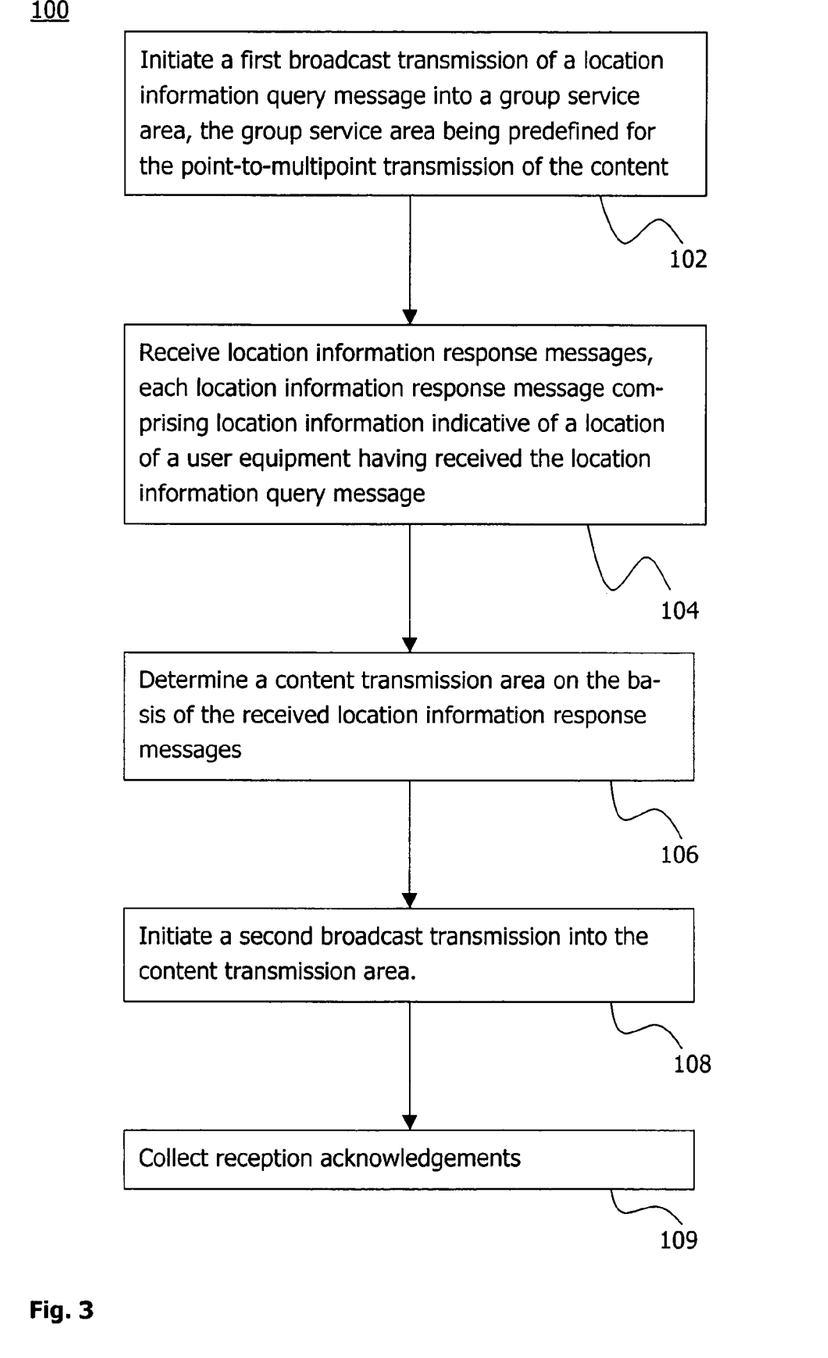
FIG. 3 is a flowchart illustrating a first method embodiment for controlling content distribution in a broadcast-enabled network environment.

With reference to FIG. 3, a flow chart 100 shows the individual steps of a first method embodiment for controlling content distribution in a broadcast-enabled network environment, for example the PLMN 150 of FIG. 1.

In step 102, a first broadcast transmission of a location information query message or "hot-spot query message" into a group service area is initiated, for example into the group service area 154 of FIG. 1. The group service area is predefined for the service. The hot-spot query message is broadcasted (for example using the MBMS broadcast mode) into the entire group service area 154.

In step 104, location information response messages are received. Each location information response message comprises location information indicative of a location of a user equipment having received the location information query message.

In step 106, a content transmission area 156, 157, 158 is determined on the basis of the received location information response messages. This step may comprise the substep of waiting for the response messages to arrive. The waiting time may be in the range of a few 100 milliseconds to a few seconds. The response messages received within the waiting interval may then be evaluated regarding the included location information. The hot spot areas 156, 157, 158 may be determined accordingly.

In step 108, a second broadcast transmission into the content transmission or hot spot area 156, 157, 158 is initiated. In a further step 109, reception acknowledgements may be collected which have been sent from the UEs acknowledging receipt of the content. The step 109 may be mandatory or may be an optional step.

Figure 4:
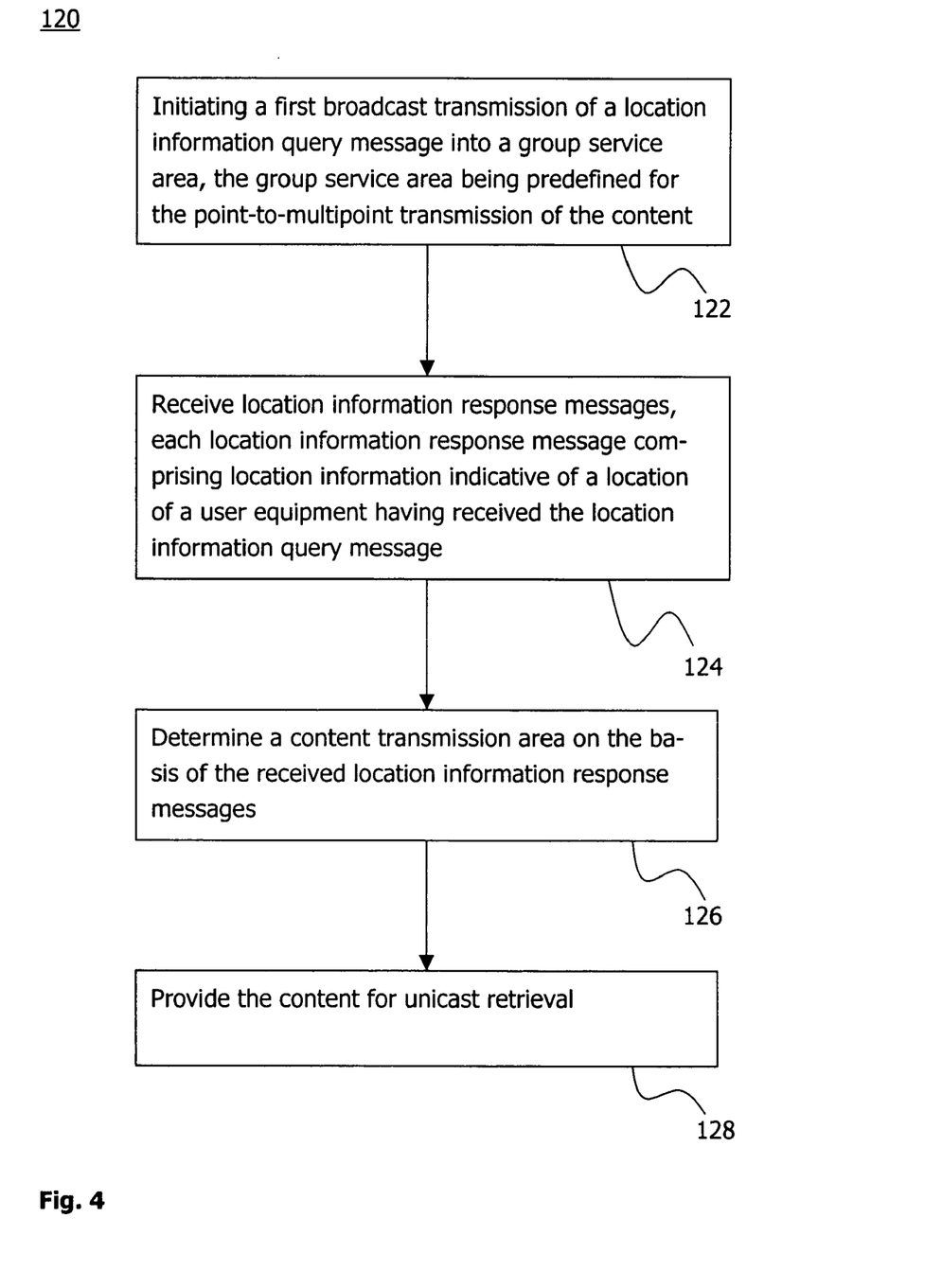
FIG. 4 is a flowchart illustrating a second method embodiment for controlling content distribution in a broadcast-enabled network environment.

With reference to FIG. 4, a flow chart 120 shows the individual steps of a second method embodiment for controlling content distribution in a broadcast-enabled network environment. The second method embodiment may be combined with the first method embodiment described above with reference to FIG. 3.

In step 122, a first broadcast transmission of a location information query message into a group service area is initiated. The group service area is predefined for the point-to-multipoint transmission of the content. In step 124, location information response messages are received. Each location information response message comprises location information indicative of a location of a user equipment having received the location information query message.

In step 126, a content transmission area is determined on the basis of the received location information response messages. In step 128, the content is provided for unicast retrieval.

Figure 5:
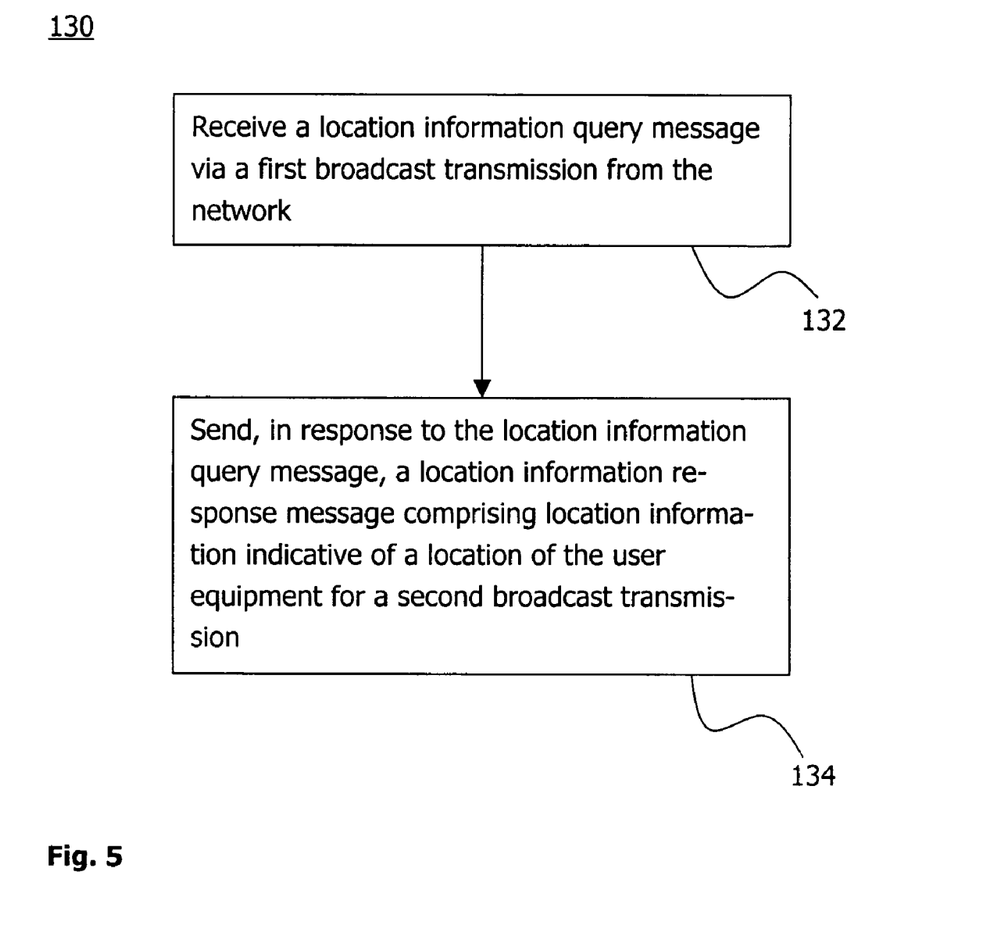
FIG. 5 is a flowchart illustrating a first method embodiment for controlling content reception from a broadcast-enabled network in a user equipment.

With reference to FIG. 5, a flow chart 130 shows the individual steps of a first method embodiment for controlling content reception from a broadcast-enabled network in a user equipment.

In step 132, a location information query message is received via a first broadcast transmission from the network. In step 134, in response to the location information query message, a location information response message is sent comprising location information indicative of a location of the user equipment for a second broadcast transmission.

Figure 6:
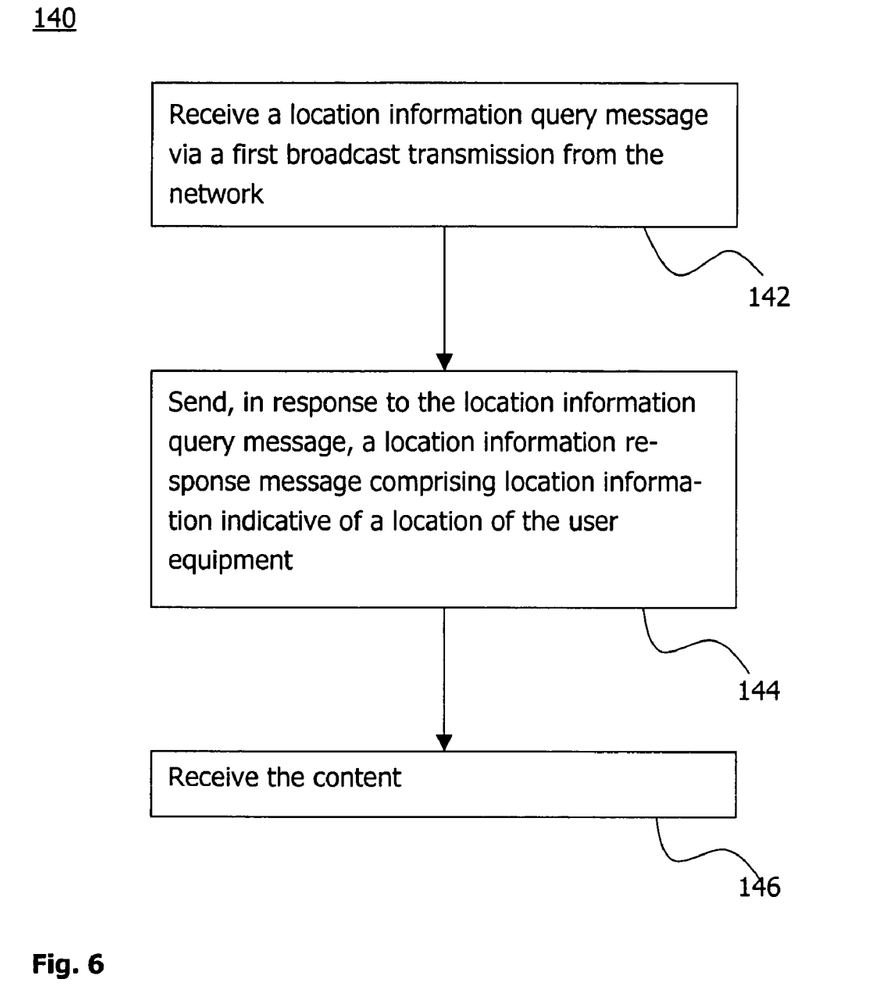
FIG. 6 is a flowchart illustrating a second method embodiment for controlling content reception from a broadcast-enabled network in a user equipment.

With reference to FIG. 6, a flow chart 140 shows the individual steps of a second method embodiment for controlling content reception in a user equipment.

In step 142, a location information query message is received via a first broadcast transmission from the network. In step 144, in response to the location information query message, a location information response message is sent comprising location information indicative of a location of the user equipment. In step 146, the content is received.

Figure 7:
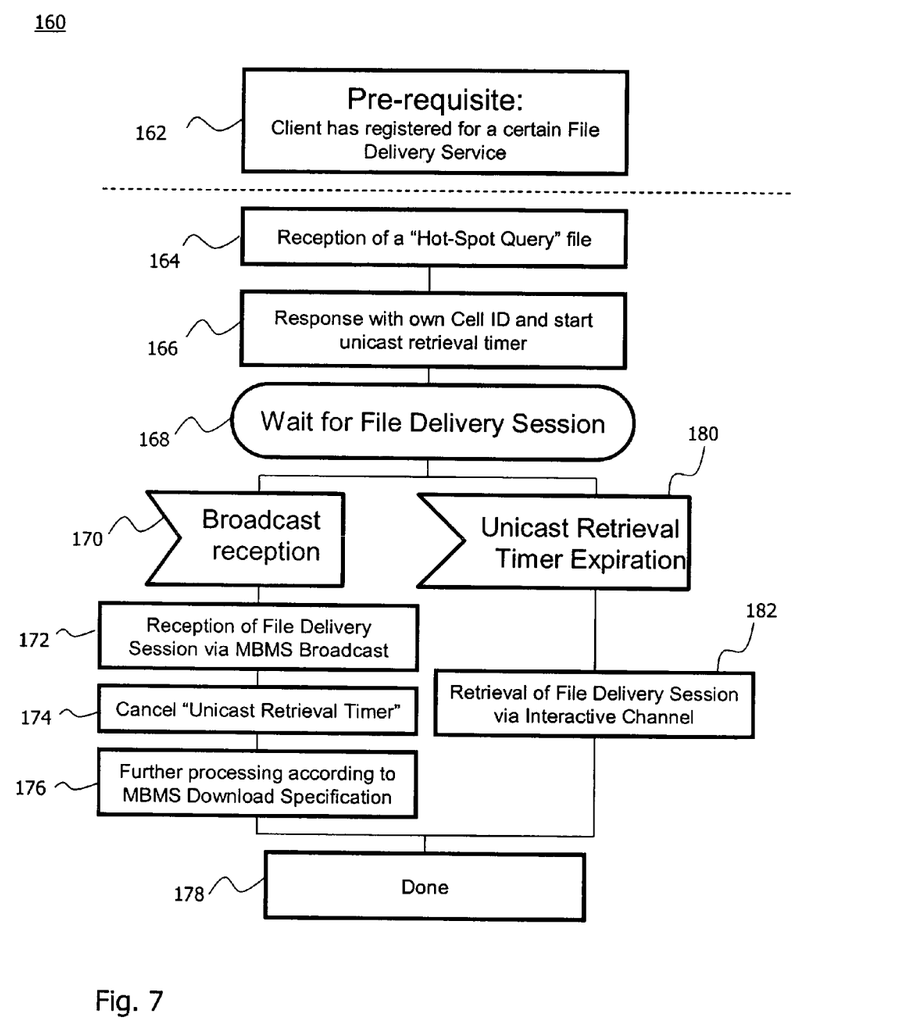
FIG. 7 is a flowchart illustrating a third method embodiment for controlling content reception from a broadcast-enabled network in a user equipment.

FIG. 7 is a flow chart 160 showing the individual steps of a third method embodiment for controlling content reception from a broadcast-enabled network in a user equipment.

In step 162, a user equipment (or client) registers for a group service. In the example shown in FIG. 7, the group service may be a file distribution (delivery) service. The file or files be distributed may contain sports news or any other content. The registration is a prerequisite for becoming a group member.

File distribution services are push services, where a service provider pushes one or more files into the UE (e.g. mobile phone) memory. File distribution services are typically event oriented. For instance a video clip about the final goal of a match is pushed into the phone memory of all registered users immediately after the goal has happened.

In step 164, as a preparation of a content distribution, a location information query message (also called hot-spot query message/file here) is received. In response to the query message, in step 166 the user equipment prepares and sends a location information response message containing the ID of the cell the UE momentarily is located in. Triggered by the reception of the query message, also a unicast retrieval timer is started.

In step 168, the UE waits for the broadcast transmission of the content to start. In the event 170 that a broadcast transmission is received (the UE is inside the content transmission area), in step 172 the file to be delivered via the broadcast transmission is received. The MBMS broadcast procedure is in detail specified in the 3GPP TS 23.246 and will therefore not be described further here. In step 174, the unicast retrieval timer is stopped upon successful reception of the file to be delivered. In step 176, further processing is performed according to the MBMS download specification. For example, a reception reporting procedure according to Sec. 9.4 in the TS 26.346 may be performed. The method ends in step 178.

In case the UE is not inside the content transmission area, the step 168 of waiting for the broadcast transmission to start will continue until in step 180 the unicast retrieval timer expires. Due to timer expiry, in step 182 the file will be retrieved via a unicast communication, i.e. the file delivery session will be performed via an interactive channel. The unicast address might be known to the UE from the registration and/or might be provided within the hot-spot query message. The UE might randomly delay the start of the unicast communication to prevent overload at the content data source or in the network (radio interface). This method branch ends after successful unicast retrieval of the content file in step 178.

Figure 8:
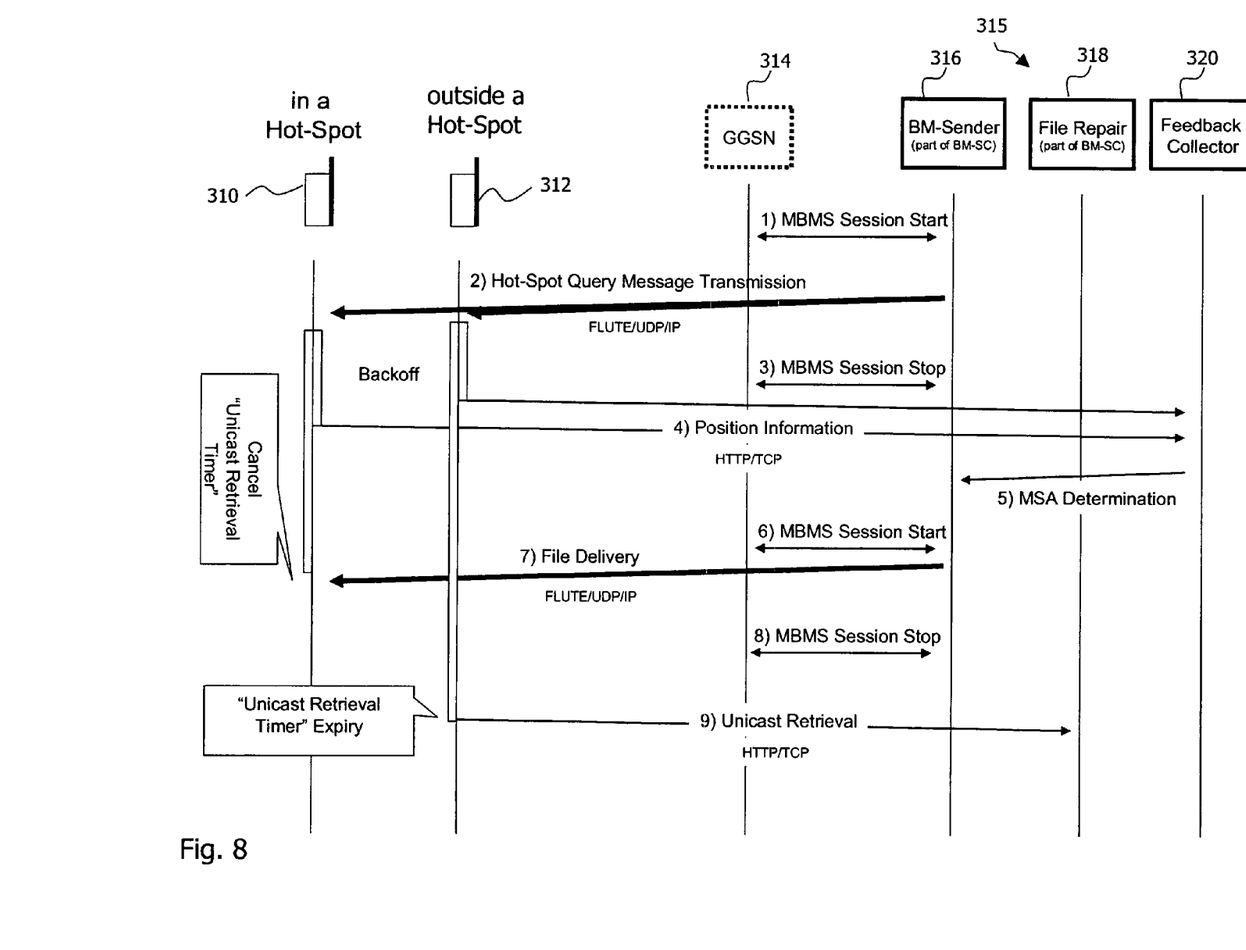
FIG. 8 is a message sequence chart illustrating content distribution in a broadcast-enabled network environment.

FIG. 8 shows a message sequence chart (call flow) of a further embodiment of content transmission in a broadcast-enabled network environment. Involved in the message sequence are a first UE 310 and a second UE 312. Further, a GGSN (Gateway GPRS Support Node) 314 of the broadcast-enabled network is depicted. The network also comprises a BM-SC 315 including three functional components 316, 318, 320, which are shown as separate units for illustrative purposes in FIG. 8. In general, the components of a BM-SC 315 may be implemented on a single hardware unit or may be implemented on several separate hardware units.

The numeral 316 denotes a BM sender for initiating and controlling MBMS broadcast transmission sessions. Reference numeral 318 denotes a functional component for the File Repair service known from the 3GPP TS 26.346, Sec. 9.3. The feedback collector 320 of the BM-SC 315 receives location information response messages and determines a content transmission area on the basis of the received location information response messages. Although part of the BM-SC 315, some or all of the subparts 316, 318, 320 may have their own network addresses, for example the feedback collector 320 may be addressed directly.

Reference numerals 1)-9) denote the essential steps of the PTM content transmission procedure according to the embodiment illustrated in FIG. 8. In step 1), one or more files are ready for distribution for the group service under consideration. The BM-sender 316 therefore initiates an MBMS broadcast session via the MBMS session is start procedure as specified in the TS 23.246. In this context, the GGSN 314 is triggered for MBMS bearer resource provision.

After bearer establishment, in step 2) the hot-spot query message (location information query message) is transmitted using the FLUTE protocol on the MBMS Bearer Service (see TS 26.346, sec. 7 in this respect) over IP-UDP-ALC (IP Internet Protocol, UDP User Datagram Protocol, ALC Asynchronous Layered Coding). The hot-spot query message is broadcasted (using the MBMS broadcast mode) into the entire group service area.

The MBMS service area is set to the group service area of the group service. Therefore the hot-spot query message is transmitted into the entire group service area for this MBMS group service.

The hot-spot query message queries the cell identifiers (IDs) of the group members. It further on announces the URI (Uniform Resource Identifier) for unicast retrieval of the file delivery session, i.e. contains the address of the feedback collector 320.

Further, start time information may be bound to the URI and provided with the hot-spot query message. This start time information indicates how long the UE 310, 312 shall wait for the broadcast transmission. For example, a value of 20 seconds may be indicated.

Further, the hot-spot query message may contain a response delay information to protect the uplink and the servers against overload and congestion conditions. Each UE shall randomly delay the response within a time interval indicated with the response delay information.

After transmission of the hot-spot query message into the group service area, in step 3) the BM-sender 316 tears down the MBMS bearer.

In step 4), upon reception of the hot-spot query message the UEs 310, 312 respond and report their location by sending a location information response message to the address of the feedback collector 320 indicated in the hot-spot query message. The reported location might comprise a cell ID indicating the cell of the group service area within which the hot-spot query message was distributed in step 2). Other location information might be send additionally or alternatively, for example the geographical position.

The location information response messages of the UEs 310, 312 and further UEs (not shown) having received the hot-spot query message are sent using the known IP-TCP-HTTP protocol stack (TCP Transmission Control Protocol, HTTP Hypertext Transfer Protocol). As the hot-spot query message contained a response delay information indicating a time delay for sending the location information response messages, the response messages of different UEs will be randomly delayed. This is exemplarily indicated in FIG. 8, where UE 310 delays its response to a larger amount than does UE 312. In this way, an uplink overload due to response messages simultaneously sent by all responding UEs is avoided.

In step 5), the feedback collector 320 works as an interface component of the BM-SC 315 and receives the location information response messages of the UEs 310, 312 (and many further UEs). The feedback collector 320 further works to determine a content transmission area on the basis of the received location information response messages. For example, the content transmission area may contain all cells, from within at least five UEs have responded to the hot-spot query message. Further, the feedback collector 320 may consider the movement of the UEs along roads and railway tracks until the content transmission actually starts and during the time of the transmission. The appropriate cells may be included in the content transmission area. The feedback collector may further determine the broadcast distribution tree for the content transmission.

The feedback collector reports the determined content transmission area containing one or more hot-spot areas and the broadcast distribution tree to the BM-sender 316. In step 6), the BM-sender 316 establishes a new MBMS broadcast bearer. The bearer may in general be any legacy interactive/streaming bearer suitable for the content transmission. The bearer is established towards the cells of the content transmission area, i.e. the hot-spots determined by the feedback collector 320. In step 7), the files intended for distribution are delivered into the content transmission area using the Flute procedure over IP-TCP. The file delivery session ends in step 8), when the BM-sender 316 releases the MBMS bearer.

During step 7), only UE 310 received the content intended for distribution. UE 312, on the other hand is located outside the content transmission area, i.e. outside the hot-spots. UE 312 might for example be the only UE in its cell, which responded to the hot-spot query message, and this cell has therefore been determined to not be part of the content transmission area by the feedback collector 320. Therefore, the UE 312 has to retrieve the content via a unicast communication. In step 9), the UE 312 fetches the content using HTTP-TCP from the unicast URI which was provided in the hot-spot query message. For this purpose, the known MBMS file repair service as implemented in the functional component 318 is used. For instance, the UE 312 may start the HTTP retrieval procedure 30 seconds after reception of the hot-spot query message. The UE 312 should have received an MBMS broadcast transmission approx. 20 seconds after reception of the hot-spot query message according to the start time information included therein.

As has become apparent from the above embodiments, the overhead of pure multicast transmissions which include complex group management functions can be avoided, while increasing the efficiency of content distribution compared to pure broadcast transmission including transmitting content into areas with a potentially low user density or even being devoid of users.

By appropriately configuring a PTM service as illustrated above, an operator of a PLMN may minimize network resource usage in comparison to known broadcast/multicast services. For example, the operator may choose a proper size for the smallest areas to be included in the content transmission area according to the network topology of the network, or the operator may configure the threshold for the user density in such a way as to serve best the users registered to a group without excessive waste of network resources.

The techniques can advantageously be implemented on top of, for example, the broadcast feature of a broadcast-enabled network. Further, in one implementation no new data have to be handled in a user equipment; any UE in operation knows its location, at least it has access to the ID of the cell it is located in.

In general, the proposed techniques allow to offer "multicast-like" services without actually having to implement the entire feature framework of known multicast services.

While the current invention has been described in relation to its preferred embodiments, it is to be understood, that this description is intended for illustrative, non-limiting purposes only. The invention shall be limited only by the scope of the claims appended hereto.

The invention claimed is:

1. A method for controlling content distribution in a broadcast-enabled network environment, the method comprising the steps of:
    initiating a first broadcast transmission of a location information query message into a group service area predefined for a content distribution service;
    receiving location information response messages, each location information response message comprising location information indicative of a location of a user equipment having received the location information query message;
    determining a content transmission area on the basis of the received location information response messages;
    predicting the locations of items of user equipment during a second broadcast transmission, the content transmission area determined to comprise a geographical area of the network in which at least a predetermined quantity of the items of user equipment will be located during the second broadcast transmission according to the prediction; and
    preparing for content distribution via at least one of the second broadcast transmission into the content transmission area and unicast retrieval.

2. The method according to claim 1, wherein the group service area is a geographical area and the content transmission area comprises a sub-area within the group service area.

3. The method according to claim 2, wherein the group service area is a set of cells of the network and the content transmission area comprises a subset from the set of cells of the group service area.

4. The method according to claim 1, wherein the location information query message comprises a location information indicator indicating the type of location information to be comprised in the location information response message.

5. The method according to claim 1, wherein the location information query message comprises a start time information
    the start time information indicating at least one of a time for the second broadcast transmission to start and a point in time or waiting period for the user equipment to initiate unicast retrieval.

6. The method according to claim 1, wherein the location information query message comprises an address information indicating an address for a unicast retrieval of the data transmitted into the content transmission area.

7. The method according to claim 1, wherein the location information query message comprises a response delay information indicating a time delay for sending the location information response message.

8. The method according to claim 1, comprising the step of providing the content for unicast retrieval using a file repair service.

9. The method according to claim 1, wherein the content transmission area is determined to comprise a geographical area of the network in which at least a predetermined quantity of items of user equipment is located.

10. The method according to claim 1, comprising the further step of determining from at least one of the location information response messages identity information related to at least one of the corresponding user equipment and a user of the corresponding user equipment.

11. A method for controlling a user equipment for content reception in a broadcast-enabled network, the method comprising the steps of:
   receiving a location information query message via a first broadcast transmission from the network;
   sending, in response to the location information query message, a location information response message comprising location information indicative of a location of the user equipment for a second broadcast transmission;
   predicting locations of items of user equipment during a second broadcast transmission, wherein a content transmission area is determined to comprise a geographical area of the network in which at least a predetermined quantity of items of user equipment will be located during the second broadcast transmission according to the prediction; and
   preparing for content reception via at least one of the second broadcast transmission and unicast retrieval.

12. The method according to claim 11, further comprising the step of receiving the content via the second broadcast transmission.

13. The method according to claim 11, further comprising the step of receiving the content via a unicast retrieval.

14. The method according to claim 11, wherein the location information comprises at least one of a cell identification of a cell of the network the user equipment is located in and a geographical position of the user equipment.

15. The method according to claim 11, further comprising the step of setting a unicast retrieval timer.

16. The method according to claim 15, wherein a timer value for the unicast retrieval timer is determined based on a start time information comprised in the location information query message.

17. The method according to claim 15, further comprising retrieving the content via unicast after expiration of the unicast retrieval timer in case the content has not been or can not be received via broadcast transmission.

18. The method according to claim 11, wherein the step of sending the location information response message is randomly delayed.

19. A network node implementing a group service control component in a broadcast-enabled network environment for controlling content distribution, the network node comprising:
   a first interface for initiating a first broadcast transmission of a location information query message into a group service area predefined for a content distribution service;
   a second interface for receiving location information response messages, each location information response message comprising location information indicative of a location of a user equipment having received the location information query message;
   a processing unit for
      determining a content transmission area on the basis of the received location information response messages and
      predicting the locations of items of user equipment during a second broadcast transmission, wherein the content transmission area is determined to comprise a geographical area of the network in which at least a predetermined quantity of items of user equipment will be located during the second broadcast transmission according to the prediction; and
   a third interface for initiating the second broadcast transmission into the content transmission area.

20. A network node implementing a group service control component in a broadcast-enabled network environment for controlling content distribution, the network node comprising:
   a first interface for initiating a first broadcast transmission of a location information query message into a group service area predefined for a content distribution service;
   a second interface for receiving location information response messages, each location information response message comprising location information indicative of a location of a user equipment having received the location information query message;
   a processing unit for determining a content transmission area on the basis of the received location information response messages and predicting the locations of items of user equipment during a second broadcast transmission, wherein the content transmission area is determined to comprise a geographical area of the network in which at least a predetermined quantity of items of user equipment will be located during the second broadcast transmission according to the prediction;
   a third interface for initiating the second broadcast transmission into the content transmission area; and
   a fourth interface for controlling the provision of the content for unicast retrieval.

21. A user equipment for content reception in a broadcast-enabled network, wherein the user equipment comprises:
   a first interface for receiving a location information query message via a first broadcast transmission from the network;
   a second interface for sending, in response to the location information query message, a location information response message comprising location information indicative of a location of the user equipment for content distribution control; and
   a third interface for receiving a second broadcast transmission from the network, wherein the user equipment is in a content transmission area, the user equipment location being predicted by the network and the content transmission area comprising a geographical area of the network in which at least a predetermined quantity of user equipment will be located during the second broadcast transmission according to the prediction.

22. The user equipment of claim 21, further comprising a processor implementing a unicast retrieval timer and for setting the unicast retrieval timer.

* * * * *

UNITED STATES PATENT AND TRADEMARK OFFICE
CERTIFICATE OF CORRECTION

| | | |
|---|---|---|
| PATENT NO. | : 8,200,245 B2 | Page 1 of 1 |
| APPLICATION NO. | : 12/302955 | |
| DATED | : June 12, 2012 | |
| INVENTOR(S) | : Lohmar et al. | |

It is certified that error appears in the above-identified patent and that said Letters Patent is hereby corrected as shown below:

In Column 12, Line 30, delete "session is start" and insert -- session start --, therefor.

Signed and Sealed this
Twenty-third Day of October, 2012

David J. Kappos
*Director of the United States Patent and Trademark Office*